US009581690B2

(12) United States Patent
Knierim (10) Patent No.: US 9,581,690 B2
(45) Date of Patent: Feb. 28, 2017

(54) ALMOST REAL-TIME SAMPLING FOR GROUND-PENETRATING RADAR IMPULSES

(75) Inventor: Daniel G. Knierim, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 587 days.

(21) Appl. No.: 13/536,813

(22) Filed: Jun. 28, 2012

(65) Prior Publication Data

US 2014/0002292 A1  Jan. 2, 2014

(51) Int. Cl.
*G01S 13/00* (2006.01)
*G01S 13/88* (2006.01)
*G01S 7/41* (2006.01)
*G01S 13/02* (2006.01)
*G01V 3/12* (2006.01)
*G01S 7/527* (2006.01)
*G01S 13/22* (2006.01)

(52) U.S. Cl.
CPC ............ *G01S 13/885* (2013.01); *G01S 7/411* (2013.01); *G01S 13/003* (2013.01); *G01S 13/0209* (2013.01); *G01S 7/5273* (2013.01); *G01S 13/222* (2013.01); *G01V 3/12* (2013.01)

(58) Field of Classification Search
CPC ...... G01S 13/885; G01S 7/411; G01S 13/003; G01S 13/0209; G01S 7/5273; G01S 13/222; G01V 3/12

USPC .......................................................... 342/22
See application file for complete search history.

(56) References Cited

U.S. PATENT DOCUMENTS

| 5,673,050 | A  | * | 9/1997 | Moussally et al. ............. 342/22 |
| 6,445,334 | B1 | * | 9/2002 | Bradley et al. ................. 342/22 |
| 2003/0135328 | A1 | * | 7/2003 | Burns et al. ..................... 702/5 |
| 2006/0279450 | A1 | * | 12/2006 | Annan et al. .................. 342/22 |
| 2009/0219975 | A1 | * | 9/2009 | Lee et al. ...................... 375/130 |
| 2009/0295617 | A1 | * | 12/2009 | Lavedas et al. ................ 342/22 |
| 2010/0166330 | A1 | * | 7/2010 | Thyagarajan et al. ........ 382/250 |
| 2011/0169682 | A1 | * | 7/2011 | Chen ............................... 342/21 |

* cited by examiner

*Primary Examiner* — Frank J McGue
(74) *Attorney, Agent, or Firm* — Michael A. Nelson; Marger Johnson (57) ABSTRACT

A ground-penetrating RADAR-based system can include a transmitter configured to transmit multiple RADAR impulses and a receiver configured to receive a signal comprising return waves generated responsive to the transmitted RADAR impulses. The signal can include a direct wave portion and a reflected wave portion. The system can also include a processing unit configured to analyze the return waves by determining the direct wave portion, fitting the direct wave portion to determine parametric information corresponding to the return waves, determining the reflected wave portion, determining characteristics of the reflected wave portion based on the parametric information, and comparing the determined characteristics against known characteristics.

26 Claims, 6 Drawing Sheets

ALMOST REAL-TIME SAMPLING FOR GROUND-PENETRATING RADAR IMPULSES

BACKGROUND

Ultra-wide band (UWB) ground-penetrating RADAR technology can be used for a number of applications, such as finding mines buried in the ground. In such applications, a transmitting antenna directs an impulse toward the ground. A receiving antenna then receives a direct wave from the transmitting antenna, followed by a reflected wave from the ground. The reflected wave is typically sampled, digitized, stored, and analyzed to determine the electrical properties, and hence the material content, of the underlying ground. The outgoing impulse may be in the order of 50-1,000 picoseconds wide, with meaningful energy content from below 1 GHz up to 20 GHz or more. In these applications, the received signal must be captured with high resolution in order to distinguish subtle changes in the reflected wave.

One approach to digitizing the UWB pulses is the use of equivalent time (ET) sampling to capture the received signal. In this method, the outgoing pulse is transmitted many times, and the reflected wave is sampled and digitized once per pulse at a specific delay setting from the timing of the transmitted pulse. Multiple samples are taken at each delay setting to allow for averaging of the samples to reduce noise, and multiple delay settings are used to form an equivalent picture of the change in the reflected voltage versus the time of flight. For example, seven samples may be averaged at each delay setting, and 1,500 delay settings spaced in 10 picosecond increments may be used to capture a 15 nanosecond window of the reflected wave at an equivalent 100 Giga-Samples per second (GS/s).

ET sampling systems only need to sample once per pulse allowing such systems to use a relatively high-resolution and low-cost digitizer. However, ET systems also have a number of significant drawbacks. Firstly, acquisition time is long. For example, with regard to the example described above, 10,500 pulses would be required to acquire one reflected waveform. Secondly, if the transmitted pulses are randomized in time, e.g., spread in spectrum, to avoid detection or interference with communications, the sampling time must be similarly randomized. Any mismatch between these two will add jitter to the ET sampling process. Also, coherent interfering signals, e.g., from communication equipment, become random in nature when sampled at the rate of outgoing pulses, and thus become more difficult to recognize and remove from the data algorithmically.

A real-time (RT) sampling and digitization process is generally preferred over an ET system, but a high-resolution, high sample rate RT digitizer is quite costly. For example, a 10-bit, 30 to 50 GS/s digitizer would be needed to implement a full RT system instead of the ET system described above.

Accordingly, a need remains for improved ground-penetrating RADAR and return signal analysis systems, particularly with regard to identifying materials below ground such as buried mines.

SUMMARY

In certain embodiments, a ground-penetrating RADAR and return signal analysis system includes a transmitter, a receiver, and a processing unit. The transmitter may include a transmitting antenna suitable for transmitting RADAR impulses into the ground, and the receiver may include a receiving antenna suitable for receiving return waves resulting from the RADAR impulses transmitted into the ground. The processing unit may include any of a number of suitable components or devices, such as a digitizer, and process the return signal to determine whether a certain material or device, such as a land mine, is present at the location where the RADAR impulses were transmitted.

DETAILED DESCRIPTION

Embodiments of the disclosed technology generally include ground-penetrating RADAR and return signal analysis systems. These and other features and embodiments of the present invention proceed with reference to each of the figures.

Embodiments of the disclosed technology generally alleviate drawbacks of equivalent time (ET) systems and at a substantially lower cost than that of a full real-time (RT) system. A lower-resolution, moderately-fast digitizer may be used to capture a signal received by a receiving antenna responsive to a RADAR impulse transmitted into the ground by a transmitting antenna, along with some averaging and equivalent-time interleaving of the data to enhance the resolution and equivalent sample rate. For example, an 8-bit, 12.5 GS/s digitizer may perform well for an ultra-wide band (UWB) system intending to capture a 6-8 GHz signal.

In certain embodiments, outgoing RADAR pulses may be transmitted at random times in order to spread their spectrum. A digitizer may be running continuously, feeding data to a field-programmable gate array (FPGA) that searches for the consistent and known shape of the direct wave pulses received. For each such direct wave detected, a 16 nanosecond record, e.g., 200 samples, may be stored in memory. A best-fit, e.g., least-squares, algorithm may be implemented to find the effective time-shift of each such record that best matches the samples of the direct wave pulse at the beginning of the record to the known continuous-time shape of that direct wave pulse. In certain embodiments, the remainder of the record is not used for this best-fit matching because its content is typically expected to vary based on the nature of the ground underneath the transmitting and receiving antennas.

After several hundred such records are captured, another best-fit, e.g., least-squares, algorithm may be implemented to determine the sample values at some higher sample rate, e.g., 100 Giga-Samples per second (GS/s), that defines a band-limited continuous-time waveform best approximating the sampled and time-shifted values of the collection of records. For this second fit, the full 16 nanosecond record may be used, so as to determine the shape of the reflected wave and, in turn, the content of the ground underneath the antennas. This arrangement may advantageously provide an inherent averaging of the collection of records.

Implementations of the disclosed technology may advantageously provide a desired high equivalent sample rate and high resolution, without the cost of a full RT digitizer, while solving the major drawbacks of the current ET system. For example, because approximately 200 useful samples may be collected per outgoing pulse instead of only one, the number of outgoing pulses needed to capture sufficient data may be significantly less, thus greatly reducing the capture time.

Also, because the timing of the digitized samples can be inferred from the direct wave, e.g., as sampled in the data record itself, no dedicated circuitry is needed to time the sampling relative to the outgoing pulses. Thus, jitter errors, which would typically be created from randomizing the timing of the outgoing pulses, may be avoided.

Further, most coherent signals within the ~7 gigahertz (GHz) bandwidth of an antenna system will not alias at all, and will thus be easy to recognize and remove, e.g., by implementation of an algorithm, from the final data record. A worst-case scenario might include a coherent signal near the 6.25 GHz Nyquist frequency, which will alias to one additional coherent signal, but such should still be relatively easy to recognize and remove by the system.

Figure 1:
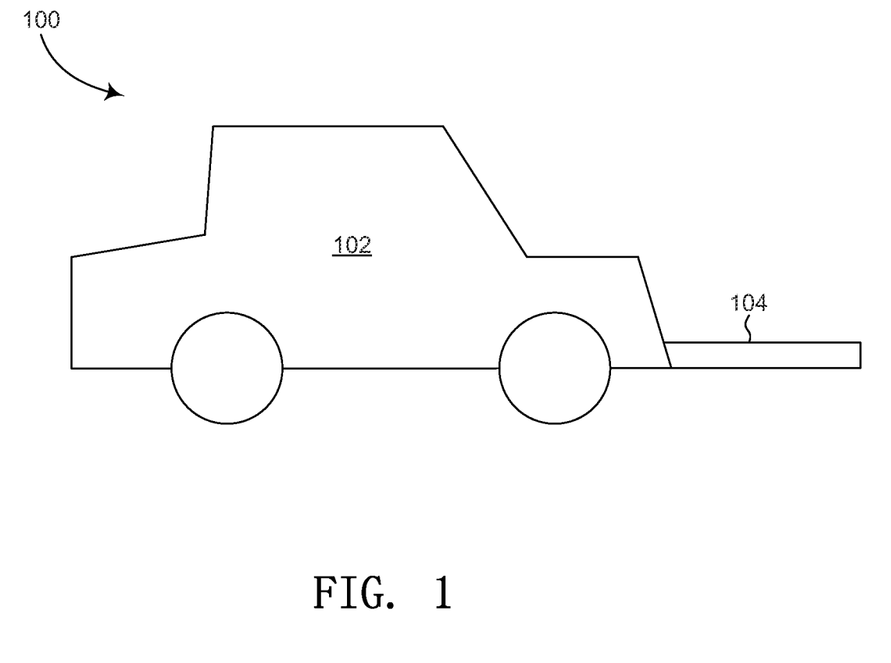
FIG. 1 illustrates an example of a mine detection system in accordance with certain embodiments of the disclosed technology.

FIG. 1 illustrates an example of a mine detection vehicle 100 in accordance with certain embodiments of the disclosed technology. In the example, the mine detection system 100 includes a vehicle 102, which can be virtually any type of vehicle suitable for traversing ground in which one or more mines or other undesirable devices may be planted. The vehicle 102 may be a car, truck, or forklift-type-vehicle, for example. In the example, the mine detection system 100 also includes a platform-like attachment extending therefrom and containing a ground-penetrating RADAR-based apparatus 104, embodiments of which will be described in detail below.

Figure 2:
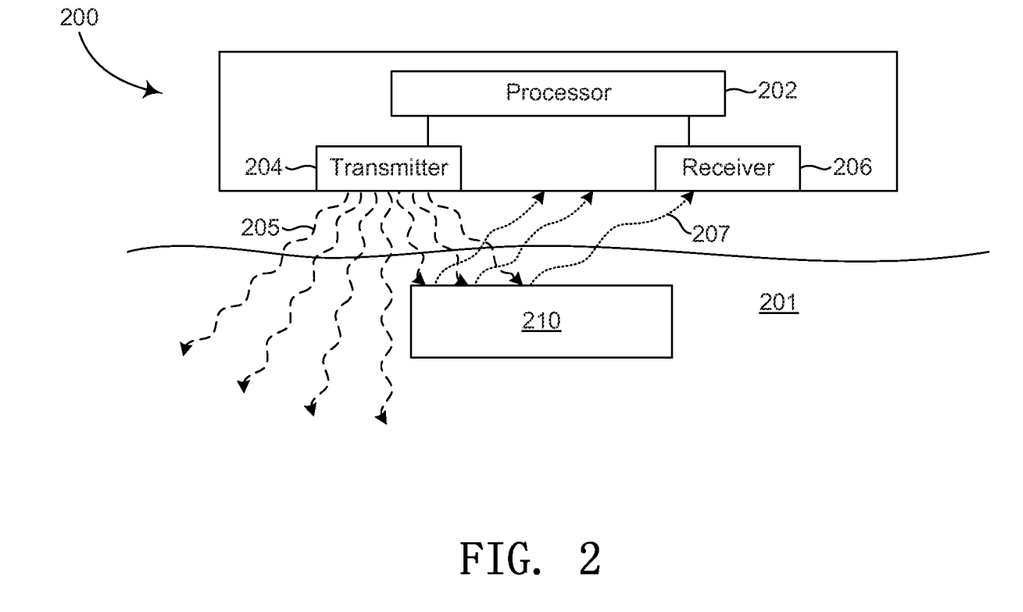
FIG. 2 illustrates an example of a ground-penetrating RADAR-based apparatus in accordance with certain embodiments of the disclosed technology.

FIG. 2 illustrates an example of a ground-penetrating RADAR-based detection apparatus 200, such as the ground-penetrating RADAR-based apparatus 104 of FIG. 1, in accordance with certain embodiments of the disclosed technology. In the example, the apparatus 200 includes a processing unit 202, e.g., a general purpose processor, a digital signal processor, a digitizer, or any suitable combination thereof. The apparatus 200 also includes a transmitter 204, e.g., a transmitting antenna, suitable for transmitting RADAR impulses 205 into the ground 201. In certain embodiments, a transmitted RADAR impulse 205 may be sent directly to a receiver, such as the receiver 206 described below.

In the example, the apparatus 200 also includes a receiver 206, e.g., a receiving antenna, suitable for receiving return waves 207 resulting from the RADAR impulses 205. In certain embodiments, the ground-penetrating RADAR-based apparatus 200 may detect a mine 210 or other type of device or material within, e.g., buried in, the ground 201 by way of the processing unit 202 analyzing the return waves 207 in view of the RADAR impulses 205. The RADAR impulses 205 and return waves 207 will be described in detail below.

In certain embodiments, the ground-penetrating RADAR-based detection apparatus 200 may be implemented as a single assembly, e.g., attached to a vehicle. In alternative embodiments, the processing unit 202, transmitter 204, receiver 206, or any sub-assembly or sub-combination thereof may each be associated with a separate assembly or device, e.g., vehicle. For example, a first vehicle may have the transmitter 204 and receiver 206 and a second vehicle may have the processing unit 202. In these embodiments, the known shape of the direct wave, which could be used to determine the effective time shift of each record, may be based on the known position of the receiver 206 with respect to the transmitter 204. Information may be exchanged between the vehicle(s) and/or location(s) using any of a number of information exchange techniques, e.g., wirelessly.

Figure 3:
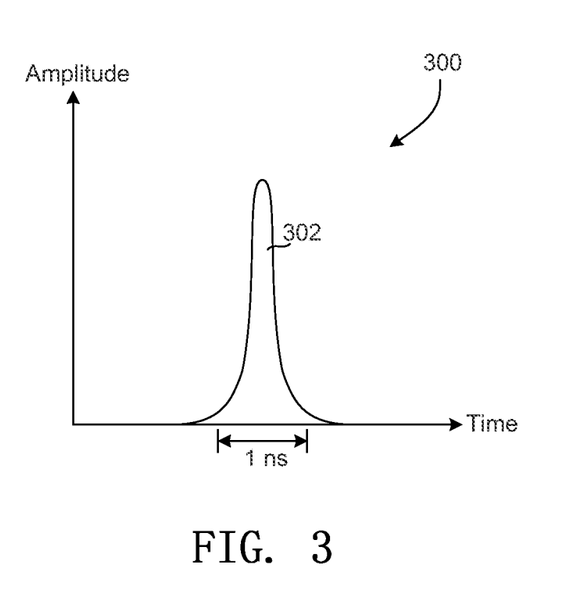
FIG. 3 illustrates an example graph of a RADAR impulse transmitted by a transmitter, e.g., a transmitting antenna, in accordance with certain embodiments of the disclosed technology.

FIG. 3 illustrates an example graph 300 of a RADAR impulse 302, such as the RADAR impulses 205 of FIG. 2, transmitted by a transmitter, such as the transmitting antenna 204 of FIG. 2, in accordance with certain embodiments of the disclosed technology. In the example, the RADAR impulse 302 has a duration of approximately one nanosecond and may consist of a single pulse or a short burst, but these characteristics may be varied. The RADAR impulse 302 may be transmitted into the ground for the purpose of detecting the possible presence of a mine, for example, by way of analyzing return waves resulting from the RADAR impulse 302. These return waves, such as the return waves 207 of FIG. 2, are described in detail below.

Figure 4:
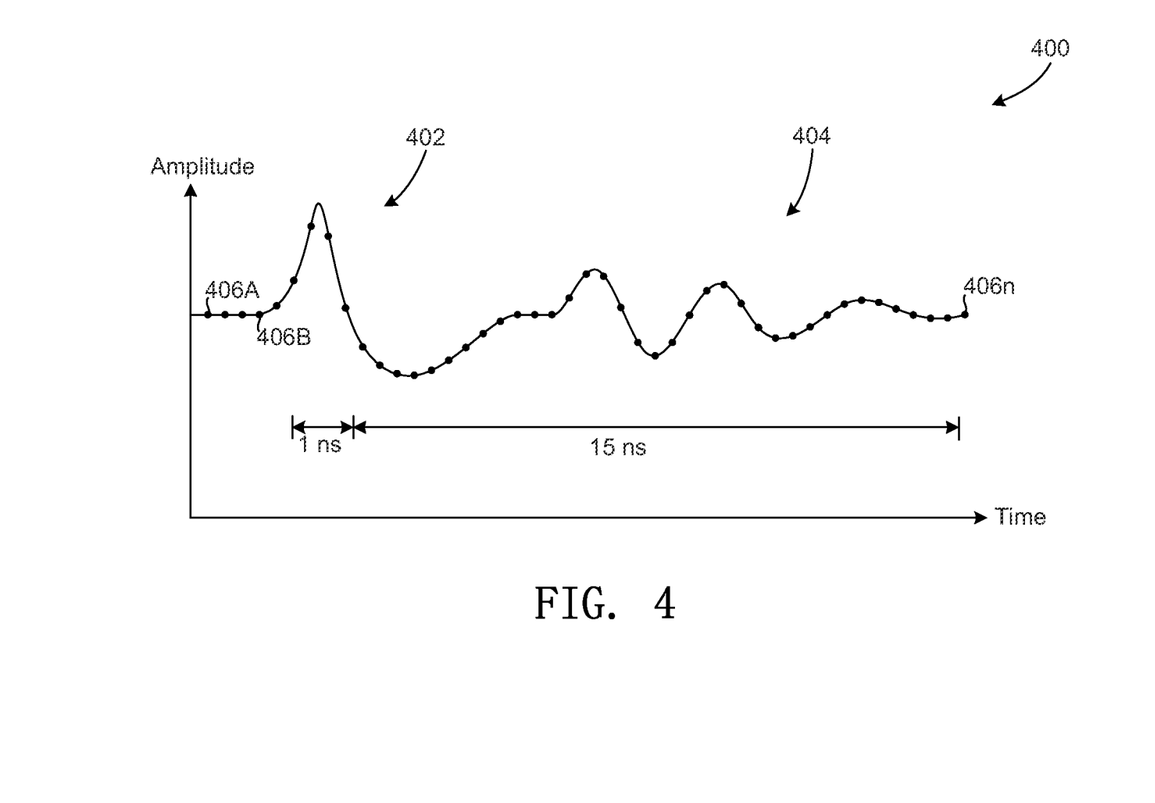
FIG. 4 illustrates an example graph of a return signal resulting from a RADAR impulse, such as the RADAR impulse of FIG. 3, as received by a receiver, e.g., a receiving antenna, in accordance with certain embodiments of the disclosed technology.

FIG. 4 illustrates an example graph 400 of a return signal resulting from a RADAR impulse, such as the RADAR impulse 302 of FIG. 3, as received by a receiving antenna, such as the receiver 206 of FIG. 2, in accordance with certain embodiments of the disclosed technology. In the example, the return signal includes a direct wave portion 402 and a reflected wave portion 404.

The direct wave portion 402 generally represents an initial signal that is useful in determining the relative timing of the return signal. This initial signal may be generated as a result of the RADAR impulse traveling directly from the transmitter to the receiver. In the example, the direct wave portion 402 is approximately one nanosecond but this value may vary depending on the RADAR impulse, the relative placement of the transmitter and receiver, or both.

The reflected wave portion 404 of the return signal generally represents return waves bouncing from the target area, e.g., ground, or object within the target area, such as a particular device, e.g., mine. In the example, the reflected wave portion 404 is approximately 15 nanoseconds but this value may vary depending on the RADAR impulse, the material into which the RADAR impulse is transmitted, or both. The return signal may be sampled, as discussed above, at various n points, e.g., 406A, 406B, to 406n. Analysis of the return signal may provide an indication as to whether certain materials or devices, e.g., land mines, are believed to be present at a particular location, e.g., under the ground, in accordance with methods such as those described below.

Figure 5:
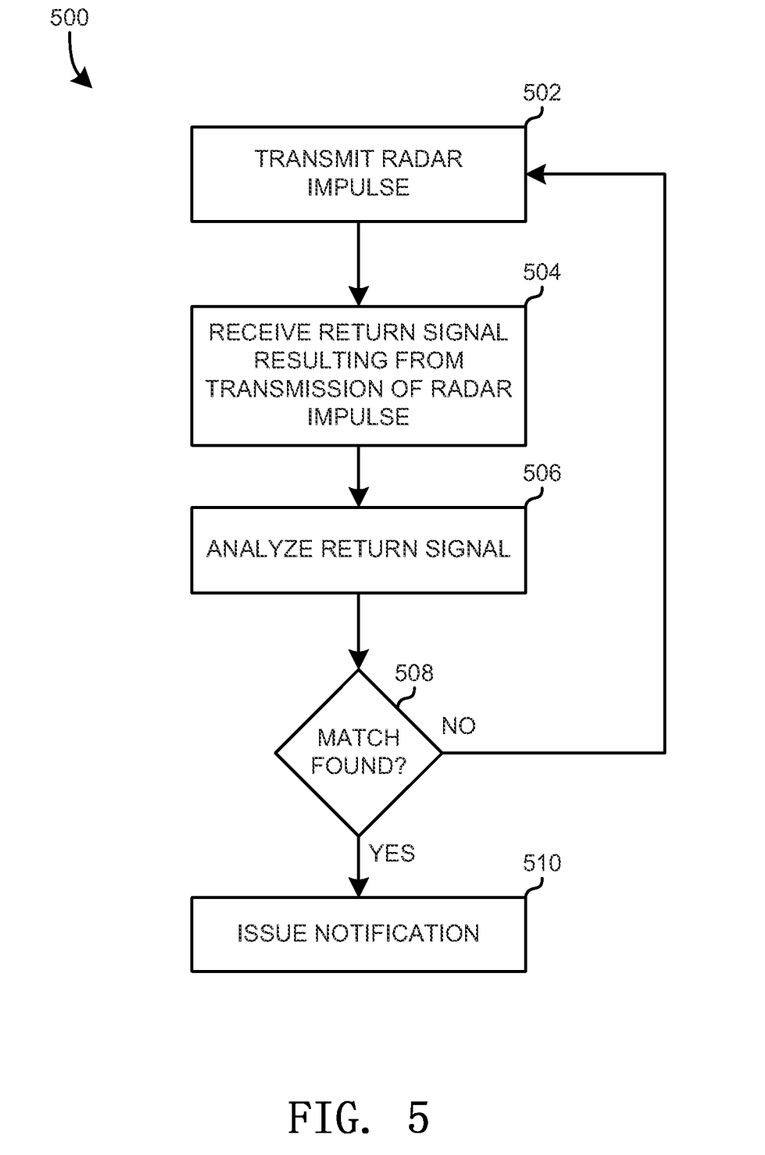
FIG. 5 illustrates a flow diagram of an example method for sending RADAR impulses and analyzing return signals resulting therefrom in accordance with certain embodiments of the disclosed technology.

FIG. 5 illustrates a flow diagram of an example method 500 for sending RADAR impulses and analyzing return signals resulting therefrom in accordance with certain embodiments of the disclosed technology. At 502, a RADAR impulse is transmitted by a transmitter, e.g., a transmitting antenna. For example, the impulse may be transmitted into the ground where a particular substance or device, e.g. a land mine or other type of buried explosive, may be located.

At 504, a return signal resulting from the transmission of the RADAR impulse at 502 is received by a receiver, e.g., a receiving antenna. The return signal generally includes a direct wave portion and a reflected wave portion and a graphing thereof may be substantially similar to the graph 400 of the return signal of FIG. 4.

At 506, the return signal is analyzed. For example, a processing unit such as a digitizer may sample the return signal so as to approximate certain qualities or characteristics of the return signal such as amplitude, curvature, etc. Embodiments of performing such an analysis on a return signal are described in detail below.

At 508, a determination is made as to whether a positive match exists based on the analysis performed at 506. For example, the processing unit may compare the approximated characteristics of the return signal against characteristics of the return signal that would be expected if a particular substance or device, e.g., mine, were present at the location where the RADAR impulse was transmitted. If there is a positive (or potentially positive) match at 508, the method 500 may continue to 510; otherwise, the method 500 may return to 502. In alternative embodiments, the method 500 may return to either 504 or 506, depending on the particular situation.

At 510, a notification is issued responsive to the positive (or potentially positive) match resulting from the determination at 508. For example, if the determination indicates that a mine may be present under the ground at the location where the RADAR impulse was transmitted, an audible and/or visual warning may be issued. Such a warning may be deployed so as to alert the operator of a mine detection system of the potential mine before driving over said mine, for example.

Figure 6:
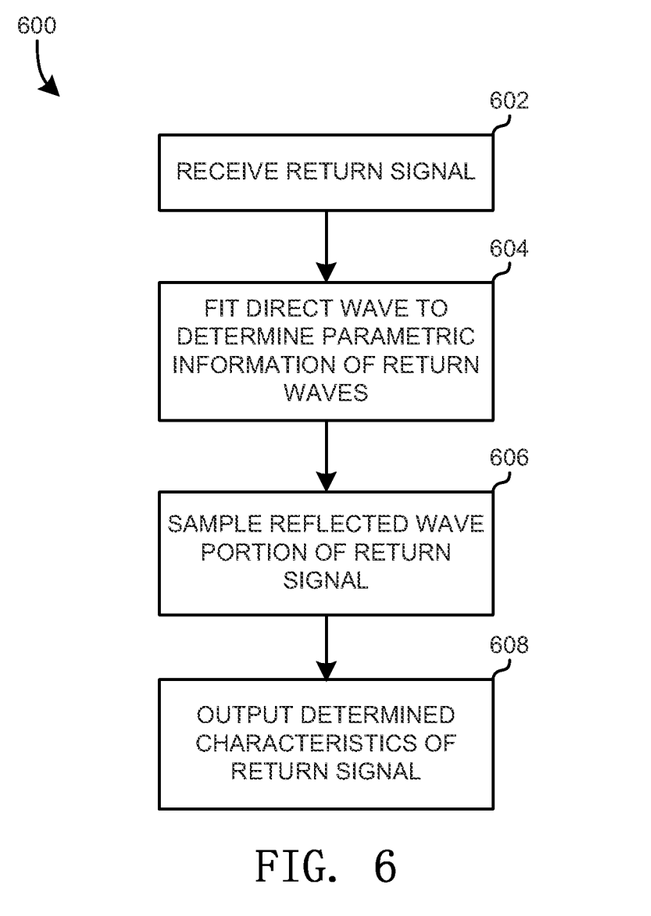
FIG. 6 illustrates a flow diagram of an example method for analyzing a return signal, such as the return signal of FIG. 4, in accordance with certain embodiments of the disclosed technology.

FIG. 6 illustrates a flow diagram of an example method 600 for analyzing a return signal, such as the return signal of FIG. 4, in accordance with certain embodiments of the disclosed technology. At 602, the return signal is received, e.g., responsive to transmittal of RADAR impulses into a particular area, such as a portion of the ground, in which a mine or other device or material may be buried. In certain embodiments, the impulses may be transmitted at a non-uniform rate.

At 604, a direct wave portion of the return signal, such as the direct wave portion 402 of the return signal illustrated in FIG. 4, is fitted so that the relative timing of the return wave portion of the return signal, such as the reflected wave portion 404 of the return signal illustrated in FIG. 4, may be determined. This relative timing information, e.g., relative time shifts, may be used in subsequent analysis of the return signal. Other information may be used, such as amplitude, e.g., if varied between the transmitted impulses.

At 606, the return wave portion of the return signal is sampled. The return wave portion may be sampled after a number of RADAR impulses, e.g., more than one but less than would be required for a prior ET system that collects only one sample per impulse, transmitted sequentially or over a certain period of time. In general, an increased number of sampling operations on the reflected wave portion will increase the time required to perform the processing thereof but increase accuracy with regard to determining characteristics of the reflected wave portion. The relative timing information may be used in conjunction with the return wave portion to align the return waves and combine them into a higher-resolution image prior to the processing at 608, for example.

At 608, the determined characteristics of the return signal may be provided as output data or information. In certain embodiments, the determined characteristics may be used to determine whether a certain material or device, e.g., land mine, is present at the area into which the corresponding RADAR impulse was transmitted. For example, the determined characteristics may be provided to a determination mechanism such as that at 508 of the method 500 illustrated in FIG. 5.

In certain embodiments, the entire return signal may be sampled by a processing unit such as a digitizer. In alternative embodiments, only a portion of the return signal may be sampled. For example, the sampling may only extend to the effective end of the reflected wave portion, e.g., when the amplitude and/or other characteristics of the return signal have dropped below a particular threshold.

The faster the system is able to detect the presence of a mine or other particularly device or material, for example, the faster a corresponding vehicle, e.g., mine detection vehicle, can travel through a certain geographic area. Also, certain embodiments may include mechanisms for removing or avoiding certain noise in the return signal. By reducing or removing noise from the signal, the system is able to evaluate a smaller signal. Also, the system may be able to detect mines, etc. at deeper depths.

In embodiments where the continuous time shape of the direct wave is not known, e.g. due to drift of the transmitter's output amplifier with temperature, but is relatively stable over the period of collecting one set of records, a correlation-of-phase of frequency components, e.g., in the ~1 to ~3 GHz range, may be used to find the appropriate time-shift of each record.

In alternative embodiments, a Nyquist band-limited copy of the outgoing pulse may be added to the receive signal so as to arrive even before the direct wave from the antenna. A phase-correlation could thus be performed on this section of the record with little to no concern of aliasing.

In certain embodiments, methods other than those described above may be employed to construct the final output from the collection of records. For example, records within a few picosecond time-shift may be averaged together, and spline fits may be applied to resultant points near each desired output point.

Sample rates, frequencies, pulse widths, etc. may generally be varied in embodiments of the disclosed technology, so long as a sufficient number of samples are taken on the direct wave (or the Nyquist-band-limited copy of the outgoing pulse) to allow for determination of the relative time-shift of each record.

The following discussion is intended to provide a brief, general description of a suitable machine in which embodiments of the disclosed technology or certain portions thereof can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A ground-penetrating radar-based system, comprising:
a transmitter configured to transmit a plurality of radar impulses;
a receiver configured to receive a signal comprising return waves responsive to the transmitted plurality of radar impulses, the return waves comprising a direct wave portion and a reflected wave portion; and
a processing unit configured to:
determine the direct wave portion,
fit the direct wave portion to determine a relative time-shift of the reflected wave portion with respect to the direct wave portion,
determine the reflected wave portion, determine one or more characteristics of the reflected wave portion based on the determined relative time-shift,
compare the one or more characteristics against at least one known characteristic, and
determine, based on the comparison, that a match exists between the one or more characteristics and the at least one known characteristic, and
in response to the determination that the match exists, output a notification to an operator of the ground penetrating radar system to notify the operator of the match.

2. The ground-penetrating radar-based system of claim 1, wherein the processing unit is further configured to align the return waves based on the determined relative time-shift of the return waves, and wherein the processing unit is further configured to combine the aligned return waves to generate a higher resolution image of the return waves prior to determining the one or more characteristics of the reflected wave portion.

3. The ground-penetrating radar-based system of claim 1, wherein the transmitter is configured to transmit the plurality of radar impulses into a particular location of ground.

4. The ground-penetrating radar-based system of claim 3, wherein the processing unit is further configured to determine whether a particular device is present at the particular location based on the comparison of the one or more characteristics against at least one known characteristic.

5. The ground-penetrating radar-based system of claim 4, wherein the particular device comprises a land mine.

6. The ground-penetrating radar-based system of claim 1, wherein the transmitter comprises a transmitting antenna.

7. The ground-penetrating radar-based system of claim 1, wherein the receiver comprises a receiving antenna.

8. The ground-penetrating radar-based system of claim 1, wherein the processing unit comprises a field programmable gate array (FPGA).

9. The ground-penetrating radar-based system of claim 1, wherein the processing unit comprises an application-specific integrated circuit (ASIC).

10. The ground-penetrating radar-based system of claim 1, further comprising a vehicle housing the transmitter, the receiver, or both.

11. The ground-penetrating radar-based system of claim 1, further comprising a vehicle housing the processing unit.

12. The ground-penetrating radar-based system of claim 1, wherein the direct wave comprises a Nyquist-band-limited copy of a transmitted radar impulse sent directly to the receiver.

13. The ground-penetrating radar-based system of claim 1, wherein the plurality of radar impulses is transmitted at a non-uniform rate.

14. The ground-penetrating radar-based system of claim 1, wherein the notification includes an audible warning, a visual warning, or both.

15. A method of analyzing radar waves, comprising:
receiving a signal at a radar receiver, the signal comprising a plurality of return waves responsive to a plurality of radar impulses, each of the return waves comprising a direct wave portion and a reflected wave portion; and analyzing, by a processing unit connected to the radar receiver, the plurality of return waves, the analyzing comprising:
  identifying the direct wave portion of the return waves;
  determining a relative time-shift of the reflected wave portion with respect to the direct wave portion, the determining of the relative time-shift including fitting the direct wave portion;
  determining at least one characteristic of the reflected wave portion of the return waves based on the relative time-shift;
  comparing the determined at least one characteristic against a known characteristic; and
  determining, based on the comparison, that a match exists between the at least one characteristic and the known characteristic; and
  in response to determining that the match exists, outputting a notification to an operator to notify the operator of the match.

16. The method of claim 15, further comprising:
transmitting, by a radar transmitter, the plurality of radar impulses before receiving the signal at the radar receiver.

17. The method of claim 16, wherein the plurality of radar impulses is transmitted into a particular area of ground.

18. The method of claim 17, wherein the signal is received from the particular area of ground.

19. The method of claim 18, wherein the analyzing further comprises:
  determining the presence of a particular device in the ground based on the comparing.

20. The method of claim 19, wherein the particular device comprises a land mine.

21. The method of claim 16, further comprising creating the direct wave portion by sending a Nyquist-band-limited copy of a transmitted radar impulse directly from the radar transmitter to the radar receiver.

22. The method of claim 16, wherein transmitting, by a radar transmitter, the plurality of radar impulses comprises transmitting, by the radar transmitter, the plurality of radar impulses at a non-uniform rate.

23. The method of claim 15, wherein identifying the direct wave portion of the return waves comprises comparing a first one of the plurality of return waves against a previously determined pattern.

24. The method of claim 15, wherein the processing unit comprises a digitizer.

25. The method of claim 15, wherein the analyzing further comprises providing the determined at least one characteristic as output information.

26. The method of claim 15, wherein the notification includes an audible warning, a visual warning, or both.

* * * * *